(12) United States Patent
Schiavon et al.

(10) Patent No.: US 12,303,949 B2
(45) Date of Patent: May 20, 2025

(54) APPARATUS AND METHOD FOR INTERNAL CLEANING OF A PIPELINE

(71) Applicant: ENI S.P.A., Rome (IT)

(72) Inventors: Riccardo Schiavon, Marghera (IT); Nicola Buongiorno, San Donato (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 18/587,767

(22) Filed: Feb. 26, 2024

(65) Prior Publication Data

US 2024/0198398 A1 Jun. 20, 2024

Related U.S. Application Data

(62) Division of application No. 17/256,758, filed as application No. PCT/IB2019/055489 on Jun. 28, 2019, now Pat. No. 12,005,483.

(30) Foreign Application Priority Data

Jun. 29, 2018 (IT) .................. 102018000006806

(51) Int. Cl.
*B08B 9/051* (2006.01)
*A46B 13/02* (2006.01)
(Continued)

(52) U.S. Cl.
CPC .............. *B08B 9/051* (2013.01); *A46B 13/02* (2013.01); *A46D 1/0207* (2013.01); *B08B 13/00* (2013.01);
(Continued)

(58) Field of Classification Search
CPC ...... A46B 13/02; A46D 1/0207; B08B 13/00; B08B 2209/04; B08B 9/045; B08B 9/047;
(Continued)

(56) References Cited

U.S. PATENT DOCUMENTS 3,983,938 A 10/1976 Hellums et al.
5,572,766 A 11/1996 Matsuura et al.
(Continued)

FOREIGN PATENT DOCUMENTS

EP 1 044 733 A2 10/2000
EP 2 295 709 A1 3/2011
(Continued)

OTHER PUBLICATIONS

International Search Report dated Mar. 3, 2020 for PCT application No. PCT/IB2019/055489, 8 pages.
(Continued)

*Primary Examiner* — Douglas Lee
(74) *Attorney, Agent, or Firm* — Ruggiero McAllister & McMahon LLC

(57) ABSTRACT

An apparatus and related process for the internal cleaning of a pipeline that includes an interchangeable rotary cleaning head, a motor device coupled to the rotary head, a movement device configured to move the apparatus inside the pipeline, and a remote control system. The combined movement of the rotary head rotation and of the advancing motion of the apparatus inside the pipeline allows the disintegration of the deposits present internally of the pipeline by mechanical action.

23 Claims, 7 Drawing Sheets

(51) Int. Cl.
  *A46D 1/00* (2006.01)
  *B08B 13/00* (2006.01)
  *F16L 55/32* (2006.01)
  *F16L 55/40* (2006.01)
  *F16L 101/12* (2006.01)
  *F16H 1/28* (2006.01)

(52) U.S. Cl.
  CPC ............... *F16L 55/32* (2013.01); *F16L 55/40* (2013.01); *B08B 2209/04* (2013.01); *F16H 1/28* (2013.01); *F16L 2101/12* (2013.01)

(58) Field of Classification Search
  CPC ...... B08B 9/051; E21B 37/02; F16L 2101/12; F16L 55/32; F16L 55/40; F16H 1/28
  See application file for complete search history.

(56) References Cited

U.S. PATENT DOCUMENTS

| | | |
|---|---|---|
| 9,683,360 B1 | 6/2017 | Mgoa |
| 2007/0151475 A1 | 7/2007 | Nicholson |
| 2007/0214590 A1 | 9/2007 | Boe |
| 2012/0145377 A1* | 6/2012 | Hallundbaek et al. . E21B 27/00 166/170 |
| 2014/0283876 A1 | 9/2014 | Fjerdingstad |
| 2016/0018045 A1* | 1/2016 | Blackburn ............. B08B 9/045 239/722 |
| 2017/0002970 A1 | 1/2017 | McKaigue et al. |
| 2017/0217018 A1 | 8/2017 | Skrinde |

FOREIGN PATENT DOCUMENTS

| | | |
|---|---|---|
| FR | 2658438 A1 | 8/1991 |
| KR | 10-1520943 B1 | 5/2015 |
| WO | 2000/61988 A2 | 10/2000 |
| WO | 2011/004183 A2 | 1/2011 |
| WO | WO-2012150864 A1 * 11/2012 | ........... B08B 9/0436 |
| WO | WO-2014011718 A1 * 1/2014 | ............... B05C 7/00 |

OTHER PUBLICATIONS

Written Opinion dated Mar. 3, 2020 for PCT application No. PCT/IB2019/055489, 12 pages.
Egyptian Office Action dated Nov. 10, 2022 from corresponding Egyptian Patent Application No. 2020121993, 5 pages.
Kazakhstan Office Action dated Jan. 25, 2022 for Kazakhstan Patent Appl. No. 2020/0893.1, 4 pages.
Welltec—Wikepedia—https://web.arhive.org/web/20150831233504/ https://en.wikepedia.org/wiki/Welltec, Aug. 31, 2015.

* cited by examiner

APPARATUS AND METHOD FOR INTERNAL CLEANING OF A PIPELINE

CROSS REFERENCE TO RELATED APPLICATIONS

This application is a divisional of U.S. patent application Ser. No. 17/256,758 filed on Dec. 29, 2020 which is a 3.71 of International Patent Application Number PCT/IB2019/055489 filed Jun. 28, 2019, which claims priority to Italian Patent Application Number 102018000006806 filed Jun. 29, 2018, the entire contents of all of which are incorporated herein by reference.

TECHNICAL FIELD

The present invention relates to an apparatus and a method for the internal cleaning of a pipeline, in particular a pipeline serving for the production of hydrocarbons. The apparatus that is the object of the present invention is particularly suitable for the removal of deposits inside the pipeline.

Prior Art

Partial or total blockage of production pipelines or plant pipelines, generally used in the field of hydrocarbon production, is a problem that has for some time afflicted the oil and gas industry.

Depending on the type of fluid transported (for example composition, rheology, and contaminants present) and on the conditions of transport (for example, pressure, temperature, velocity and course), a pipeline may be subject over time to the formation of deposits inside it with the effect of a reduction in the effective internal flow cross-section, in extreme cases resulting in the total obstruction of passage of the fluid.

Obviously, a considerable reduction in the internal flow cross-section of a pipeline entails a number of disadvantages, including greater load losses along the line that can lead to increases in internal pressure and increased consumption on the part of pumping systems to guarantee flow profiles in line with requirements. The accumulation of occluding substances within the pipeline can furthermore intensify phenomena of a local increase in velocity and vibration as well as represent a catalyst to the accumulation of debris that can then lead to a more rapid blockage rate of the line itself.

It is therefore evident that it is necessary to provide periodically for the removal of deposits present within pipelines in order to restore their complete and effective functionality. To date various methods exist with which it is possible to intervene on pipelines partially blocked by internal deposits that can be grouped into two broad categories: non-invasive and invasive.

One non-invasive method is based on co-ordinated actions of varying the pressure within the pipeline so as to create pressure wave fronts that can release energy close to the occluding deposits in such a way as to induce their detachment. Although relatively easy to implement, this method represents by far the least effective one, greatly dependent on the type and size of the deposits and almost totally useless in cases where pockets of gas are present that compromise the disruptive effect of the pressure waves generated.

Another method of non-invasive cleaning relies on the frequent and massive injection of chemical substances, generically also called chemicals, with the function of slowing, inhibiting and/or breaking up any blockages in the internal cross-section of the pipeline. Also in this case the effectiveness is not high and frequently does not allow complete cleaning of the pipeline. Furthermore, massive and periodic injection of these chemical substances necessitates dedicated items of plant engineering, and represents a sizeable running cost taking into consideration the expensiveness of the chemicals themselves.

From a non-invasive perspective, provision may also be made for sessions of flushing with solvent fluids at high temperature to facilitate the disintegration of blockages; even this method is only partially effective, expensive and involves interruption of the normal operation of the pipeline and thus suspension of production.

Focusing instead on the category of invasive methods for internal cleaning of a pipeline, different types of apparatus referred to in jargon as "pigs" that are inserted in the pipeline are widespread. The pigs remove the occluding deposits mechanically during their advancing motion, pushed by the pressure of a fluid within the pipeline. Normally the pigs are provided with a section that creates pressure tightness on the interior of the pipeline wall to guarantee the propulsive force developed by the pressure of the fluid inside the same pipeline.

Internal cleaning of pipelines by mean of pigs necessitates that the line is set up for this purpose, comprising pig launching and receiving traps, and a line loop. It is also necessary for the pressure of the propulsion fluid to be sufficient to overcome the friction and resistances arising from interaction of the pig with the pipeline.

However, use of conventional pigs does have advantages; the loss of adequate pressure within the pipeline impedes the movement of the pig, and use of this system is therefore not possible for pipelines designed for low pressures—conventional pigs clean the line mechanically by sweeping the blocking deposits away from the internal surface of the pipeline, and accumulating them frontally during their advancing motion—it is therefore evident that the excessive accumulation of material removed from the walls of the pipeline and pushed along during the movement of the pig can represent a risk of total blockage of the pipeline with loss of the pig inside the line or rupture of said line. It is therefore necessary to plan cleaning sessions using pigs the frequency of which is dependent upon the type of fluid, conditions of temperature and pressure, and type of occluding deposits. Moreover, the normal running of the pipeline must frequently be interrupted, causing interruption of the production of hydrocarbons.

In the event of total blockage of the pipeline, use of the conventional pigs described above is not recommended or even unworkable given the impossibility of moving the pig through the section of blocked pipeline.

In cases of particularly severe blockage or in the presence of hard, compacted deposits that are difficult to remove, interventions are carried out using coiled tubings (CT), devices equipped with a flexible line for transporting fluid under pressure, and a cleaning head equipped with pressure jets used for removing deposits. Obviously, the use of CT, normally with hot fluids under pressure, requires interruption of the normal operations of the pipeline and suspension of the production of hydrocarbons, and needs the use of highly complex and costly surface equipment for management, the impact of which is very great in cases of cleaning underwater pipelines for which the required apparatus must be set up on a special boat.

From the above description it is therefore evident that the known techniques for internal cleaning of a pipeline present a number of problems which involve the temporary interruption of normal running, the impossibility of cleaning pipelines that are "non-piggable", where for example there is only one access to the pipeline or the internally accumulated deposit is too hard and/or thick; the use of high-impact equipment external to the line and serving for the control and functioning of the CT; movement of the pig in only one direction along the line and the necessity for minimum conditions for the correct functioning of the pig (minimum pressure necessary for the movement).

OBJECT OF THE PRESENT INVENTION

The object of the present invention is to produce an apparatus and a process for internal cleaning of a pipeline that overcome the drawbacks of the prior art by enabling effective interventions in the internal cleaning of a partially or totally obstructed pipeline, obviating total interruption of normal running of the pipeline and therefore guaranteeing the continuity of hydrocarbon production.

General Description of the Invention

According to the present invention, an apparatus for internal cleaning of a pipeline is produced that is capable of removing deposits while avoiding interrupting the normal running of the pipeline, understood as transporting the fluids for which the pipeline is normally used.

A first object of the present invention is therefore an apparatus 1 for internal cleaning of a pipeline 5, the apparatus 1 comprising:
an interchangeable rotary cleaning head 10, 110;
a motor device 50 coupled to the rotary cleaning head 10, 110 to selectively control the rotation thereof, the motor device 50 comprising a casing 55, a gearmotor 51 accommodated within the casing 55 and a transmission shaft 56, defining an axis of rotation A, projecting from the casing 55;
a movement device 90 configured to move the apparatus 1 within the pipeline 5, the movement device 90 being connected to the motor device 50;
a remote system 7 for controlling the apparatus 1 connected to the motor device 50 and to the movement device 90 by means 8 apt to transfer electrical signals and power;
the motor device 50 being interposed between the rotary cleaning head 10, 110 and the movement device 90.

Another object of the present invention is a process for internal cleaning of a pipeline as will be described below.

BRIEF DESCRIPTION OF THE DRAWINGS

The features and the advantages of the present invention will be made clearer by the following description of some of its non-limiting example embodiments with reference to the accompanying drawings, wherein.

DETAILED DESCRIPTION OF THE INVENTION

Figure 1:
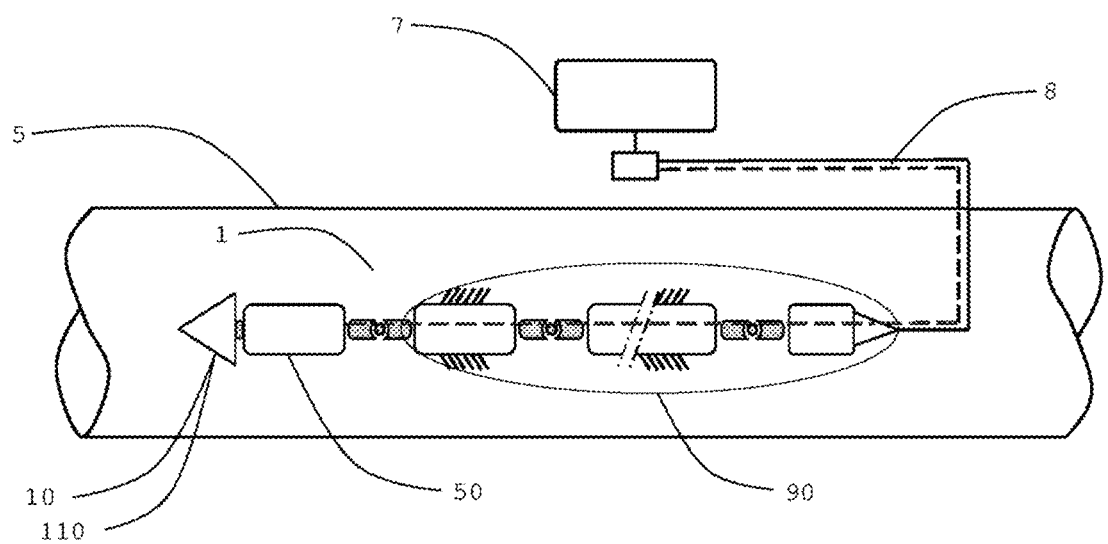
FIG. 1 shows a diagrammatic view of the cleaning apparatus, inserted into a pipeline, in which are evident the three principal components: the rotary head, the motor device and the movement device connected to a remote control system, with parts and details omitted for the sake of clarity.

For the purposes of the present invention, front is defined as a position closer to the rotating tip 30 of the rotary head 11, 110, and rear as a position closer to the motor device 50.

As anticipated, an object of the present invention is an apparatus 1 for internal cleaning of a pipeline 5, that is capable of overcoming the limitations and technical problems of the prior art by guaranteeing internal cleaning of pipeline without totally interrupting the normal functional flow of the pipeline and therefore the production of hydrocarbons in cases of a pipe serving for transportation of petroleum products.

With reference to FIG. 1, it is shown that the present invention is achieved through the combined use of three principal components: a rotary head 10, 110, a motor device 50 and a movement device 90 of the apparatus 1, which are advantageously inserted internally to a pipeline 5 and controlled by means of a remote system 7 that exchanges a plurality of signals with the apparatus 1 while also providing its electrical supply. The rotary head 10, 110 is connected to the motor device 50 which selectively allows its rotation via the transmission shaft 56 torsionally coupled to the rotary head 10, 110. The rotary head 10, 110 is interchangeable in such a way as to enable it to be substituted in case of breakage, wear or simply in cases in which different types of rotary heads are used according to the type of deposits within the pipeline. The motor device 50 comprises a gearmotor 51 which allows variation both of the speed of rotation of the rotary head 10, 110 and of the torque applied thereto. In a preferred configuration of the invention, the gearmotor 51 comprises a gearbox with epicyclic gears, suitable in particular for also controlling high torques with relatively contained dimensions having a high power density. The transmission shaft 56, projecting from the casing 55 of the motor device 50 along an axis of rotation A, is coupled to the rotary head 10, 110.

The movement device 90 instead serves for movement of the apparatus 1 which selectively determines the velocity and the direction of movement of the apparatus 1 within the pipeline 5 by means of its connection to the motor device 50. The reciprocal arrangement of the rotary head 10, 110, of the motor device 50 and of the movement device 90 configures an apparatus 1 longitudinally developed relative to the axis of the pipeline 5 wherein the components are distributed sequentially with the motor device 50 interposed between the rotary head 10, 110 and the movement device 90. The movement device 90 is similar to the family of devices already commercially available that are known in jargon as "crawlers", and is therefore known per se.

As anticipated, one of the disadvantages common to known devices for internal cleaning of pipelines is the need to interrupt normal functioning of the pipeline; an important advantage that is an object of the present invention is therefore the adoption of an apparatus 1 capable of internally cleaning a pipeline without interrupting the flow of normal functioning, but preferably temporarily reducing its output.

In a preferred configuration of the invention, therefore, the rotary cleaning head 10, 110 is provided with at least one aperture that allows passage of a fluid between the front part and the rear part of the rotary head 10, 110 or vice versa. The presence of at least one aperture in the rotary head 10, 110 guarantees the fluid normally circulating within the pipeline to be able to continue to flow in that the apparatus 1 is inserted into the pipeline 5, obviating shutdown of normal running. By contrast, therefore, with the provisions of the conventional "pigs" systems, in which the presence of apertures transparent to the circulating fluid would represent an adverse effect in that the propulsive thrust of the fluid used to move the pig would be reduced, according to the present invention the presence of said at least one aperture ensures maintaining of the circulation within the pipeline 5.

According to the present invention, the presence of one or more apertures as previously described does not influence the movement capacity of the apparatus 1 in that it is not dependent upon the thrust of the internal circulating fluid ensured by the movement device 90. Moreover, the apparatus 1 equipped with the movement device 90 is capable of advancing within the pipeline 5 independently of the direction of circulation of the fluid normally flowing within the same pipeline. Substantially, therefore, the apparatus 1 is able to move both with and against the current relative to the fluid contained in the pipeline 5 not depending on the propulsive thrust normally generated by the fluid in conventional pigs.

Figure 2:
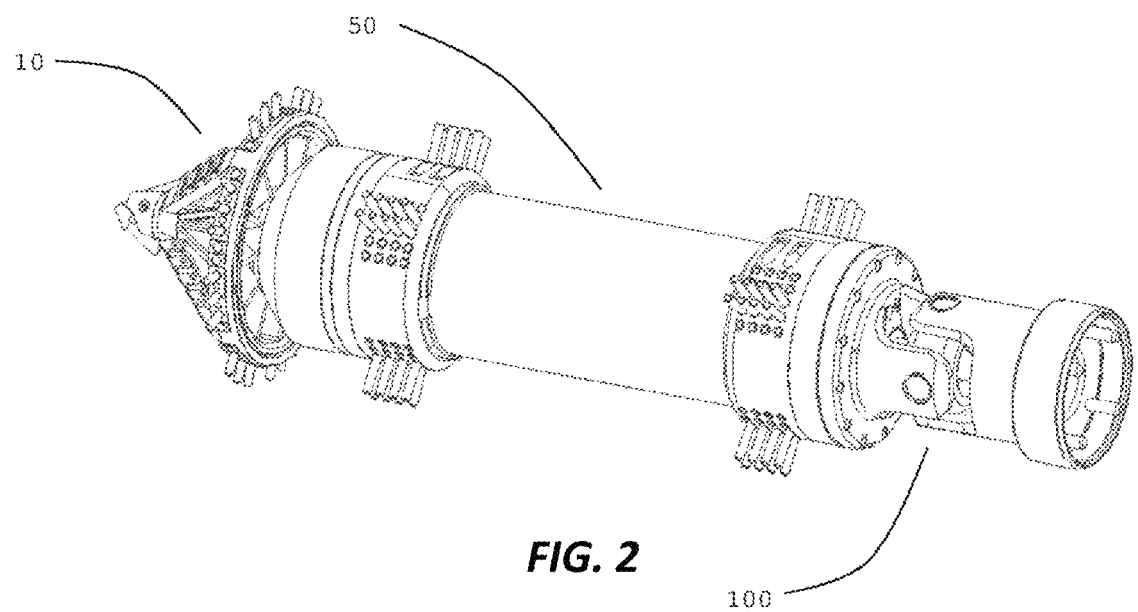
FIG. 2 shows a three-dimensional view of the rotary head connected to the motor device wherein the universal joint connecting the motor device and the movement device is also evident, parts and details omitted for the sake of clarity.

With reference to FIG. 2, with a view to ensuring an area of passage for the fluid normally circulating in the pipeline 5 even when the apparatus 1 is inserted within the same pipeline, in a further preferred configuration of the invention, the apparatus 1 for internal cleaning of a pipeline 5, the area of maximum dimensions of the casing 55 of the motor device 50 and of the movement device 90, each evaluated in a transverse section lying on a plane orthogonal to the axis of the transmission shaft 56, are smaller than the area of maximum dimensions, evaluated in a transverse section lying on a plane orthogonal to the axis of the transmission shaft 56, of the movable part 12 of the rotary head 10.

In this way, an area of passage between the apparatus 1 and the interior of the pipeline 5 is guaranteed along the entire extent of the apparatus 1, which area of passage allows the fluid normally present to flow even in the presence of the apparatus 1.

For the purpose of effective cleaning of a pipeline 5, it is necessary for the apparatus 1 to be capable of operating not only along rectilinear sections of pipeline, but also along curvilinear sections.

To this end, in a preferred configuration of the invention, in the apparatus 1 for internal cleaning of a pipeline 5, the movement device 90 is connected to the motor device 50 by means of a swivel joint 100, preferably a universal joint. The swivellable behaviour ensured by interposition of a joint 100 between the motor device 50 and the movement device 90 allows the apparatus 1 to move also along pipelines having a curvature up to five times the diameter of the pipeline.

Figure 4:
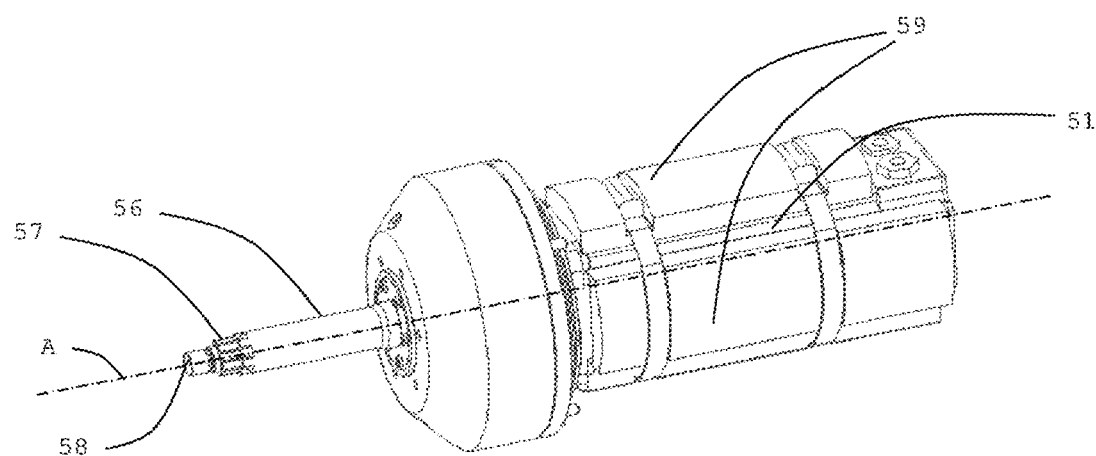
FIG. 4 shows a three-dimensional view of the gearmotor fitted with a transmission shaft and metal heat-dissipator elements, with parts and details omitted for the sake of clarity.

With reference to FIG. 4, with a view to reliable functioning and maximum availability of the apparatus 1, it is necessary for the gearmotor 51 within the motor device 50 to be adequately cooled in order to maintain temperatures compatible with continuous functioning for prolonged periods. To this end, the housing of the gearmotor 51 is advantageously equipped with metal elements 59 that are dissipators of heat on contact, apt to dispose of the heat produced by the gearmotor 51. The metal heat dissipator elements 59 are preferably obtained from material with high heat conductivity such as, for example, aluminium for the purpose of maximising the heat dissipation. To avoid accumulation of heat inside the casing 55 of the motor device 50, the casing 55 is preferably filled with a diathermic and dielectric fluid so as to create a heat bridge to transport the heat energy produced by the gearmotor 51 to the environment external to the motor device 50. A further problem due to the increase in temperature inside the casing 55 is the increase in the volume of diathermic and dielectric fluid contained therein, resulting in an increase in pressure within the casing 55. Installation of a pressure compensator, known per se, in the casing 55 allows the pressure of the diathermic and dielectric fluid to be balanced relative to the external pressure. In a preferred configuration of the invention the motor device 50 therefore comprises:

One or more metal heat dissipator elements 59 placed in contact with the housing of the gearmotor 51 the casing 55 of the motor device 50 being filled with a diathermic and dielectric fluid;

A pressure compensator exposed both to the pressure of the diathermic and dielectric fluid and to the pressure of the fluid external to the casing 55;

The pressure compensator being configured to balance the pressure of the diathermic and dielectric fluid, the volume of which is influenced by the variations in temperature induced by the metal heat dissipator elements 59 relative to the external pressure. More generally, the pressure compensator is configured to equalise the pressure of the diathermic and dielectric fluid within the casing 55 relative to the pressure present externally to the apparatus 1.

The motor device 50 has a maximum external diameter less than the internal diameter of the pipeline 5 in which it is used. It is therefore evident that, in its movement along the pipeline 5, the problem is presented of maintaining the motor device 50 in a substantially central position relative to the pipeline 5 to guarantee correct positioning of the rotary head 10, 110 connected thereto.

Figure 5:
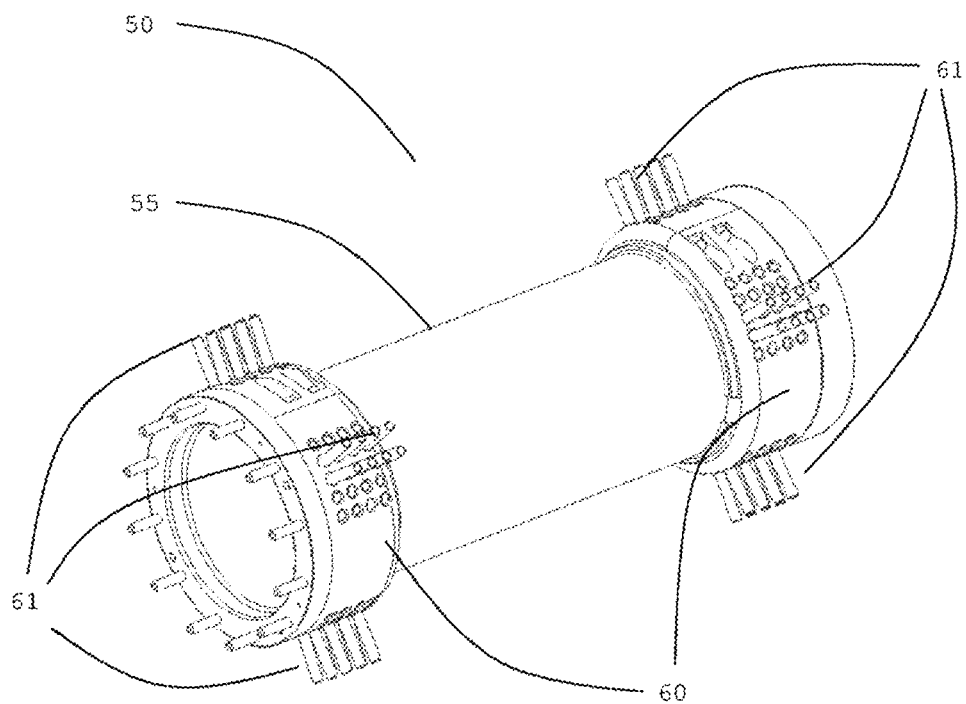
FIG. 5 shows a three-dimensional view of the casing of the motor device provided with centering brushes, with parts and details omitted for the sake of clarity.
Figure 6:
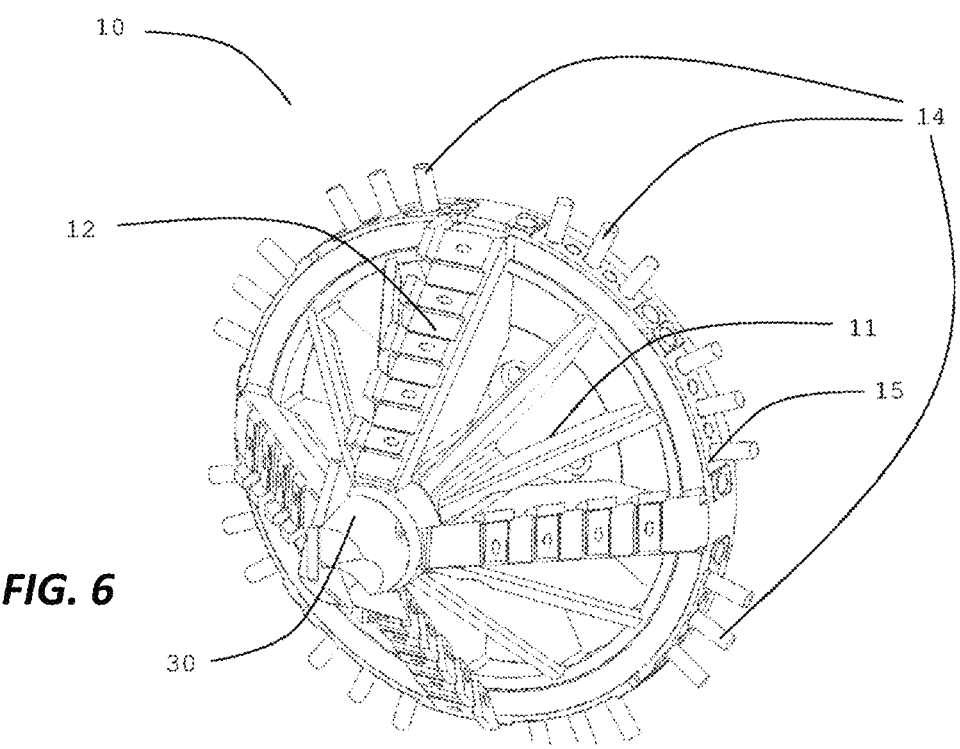
FIG. 6 shows a three-dimensional view of a particular embodiment of the rotary head, in which are visible the movable part, the fixed part, the rotating tip, the metal brushes and associated inserts, with parts and details omitted for the sake of clarity.
Figure 7:
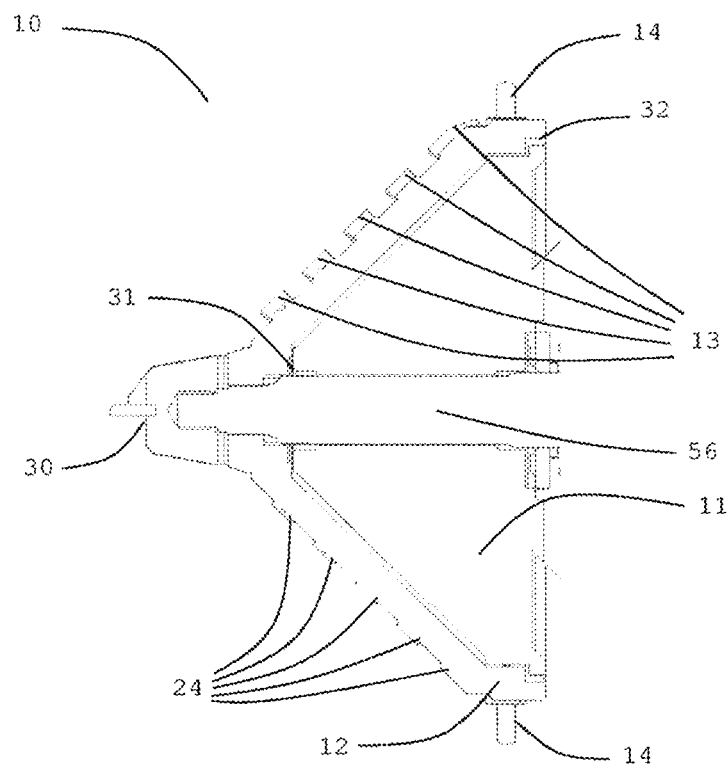
FIG. 7 shows a sectional view of the rotary head, in which are visible the movable part, the fixed part, the rotating tip, the metal brushes and associated inserts, with parts and details omitted for the sake of clarity.
Figure 8:
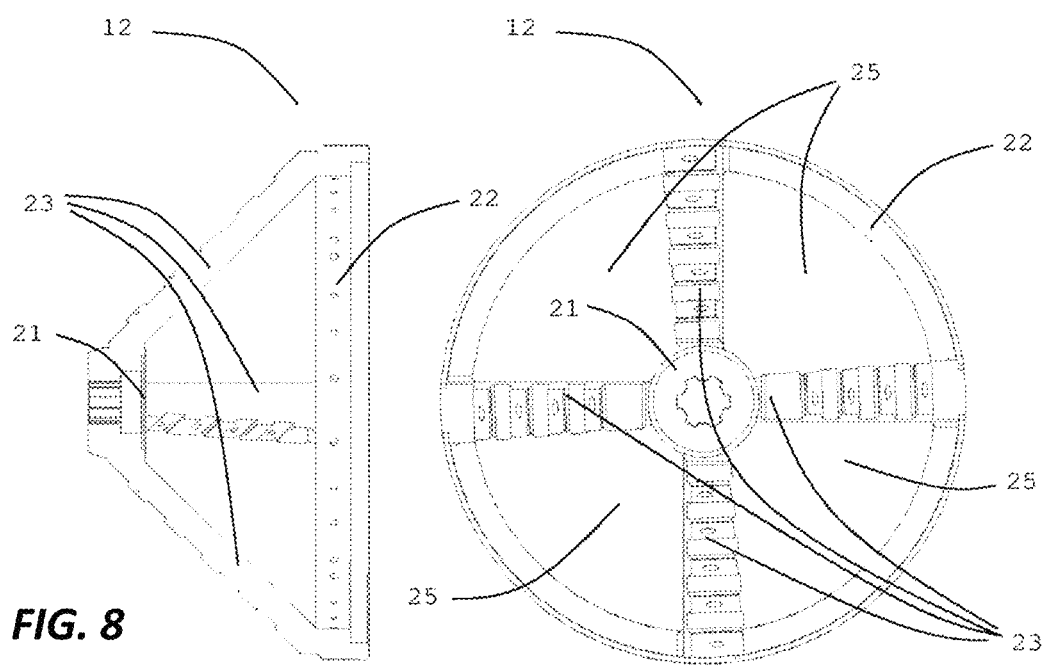
FIG. 8 shows a planar and sectional view of the movable part of the rotary head in which is shown the truncated-cone structure and the movable flow openings, with parts and details omitted for the sake of clarity.
Figure 9:
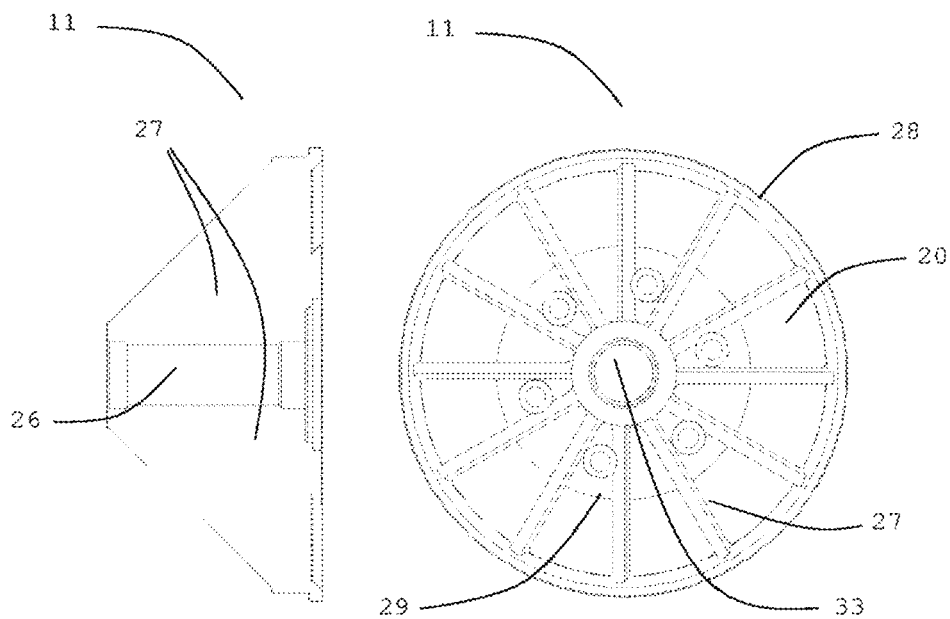
FIG. 9 shows a planar and sectional view of the fixed part of the rotary head in which is shown the truncated-cone structure and the fixed flow openings, with parts and details omitted for the sake of clarity.
Figure 10:
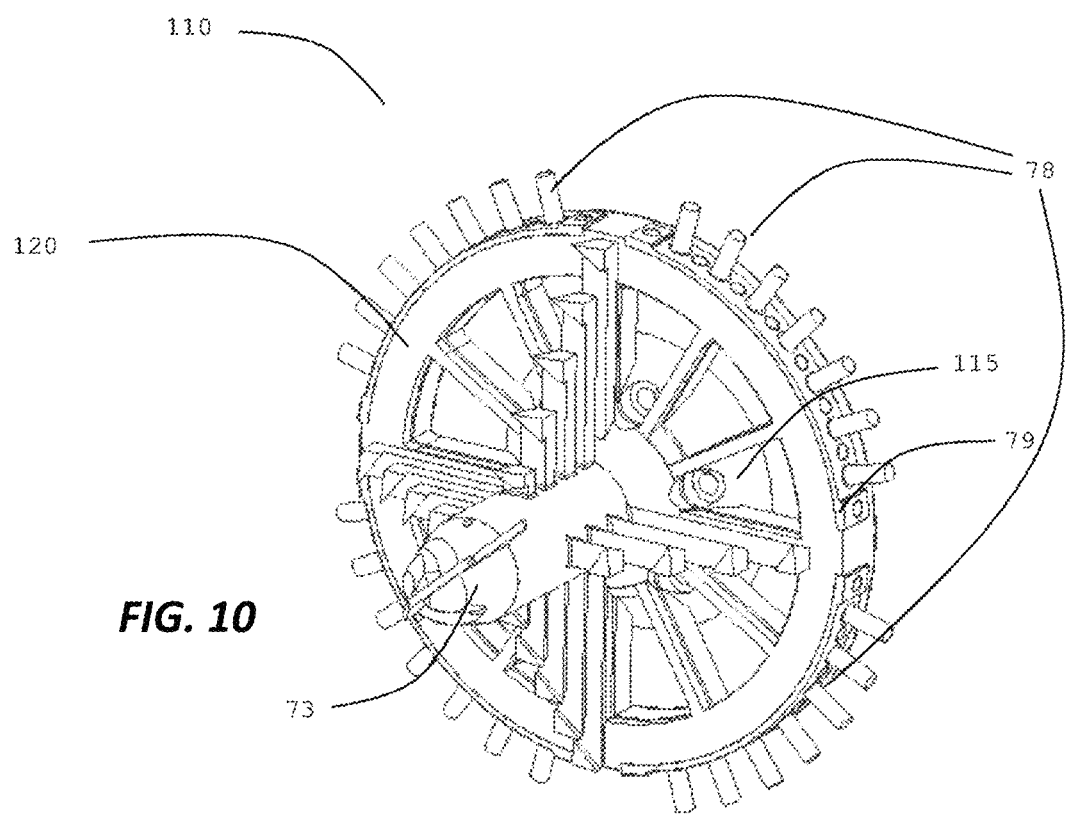
FIG. 10 shows a three-dimensional view of a particular embodiment of the rotary head in which are visible the movable part, the fixed part, the rotating tip, the metal brushes and associated inserts, with parts and details omitted for the sake of clarity.
Figure 11:
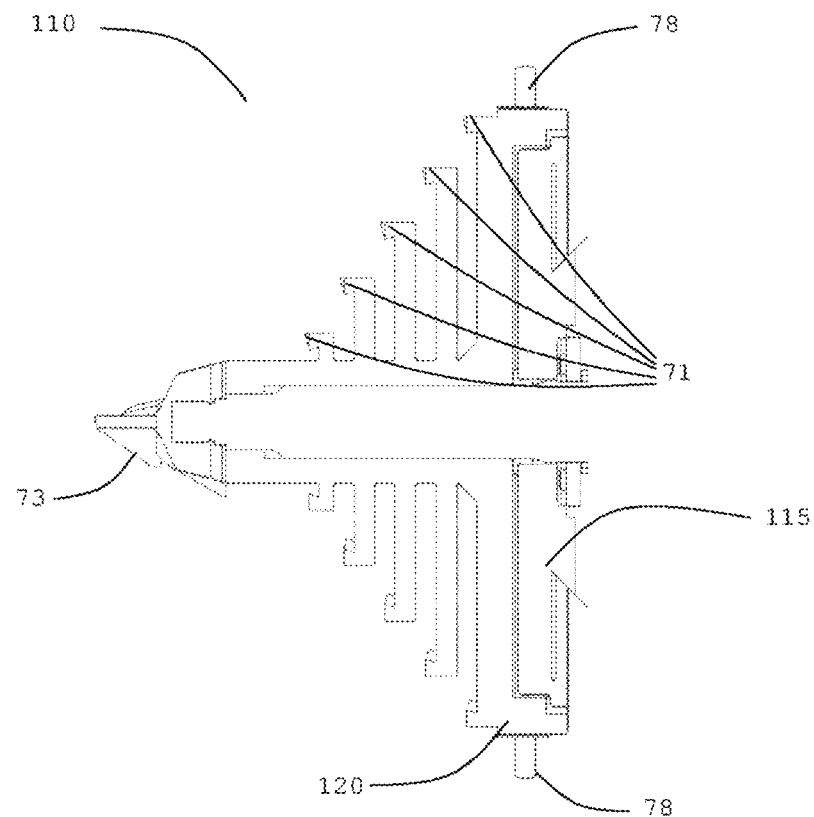
FIG. 11 shows a sectional view of the rotary head, in which are visible the movable part, the fixed part, the rotating tip, the metal brushes and associated inserts, with parts and details omitted for the sake of clarity.
Figure 12:
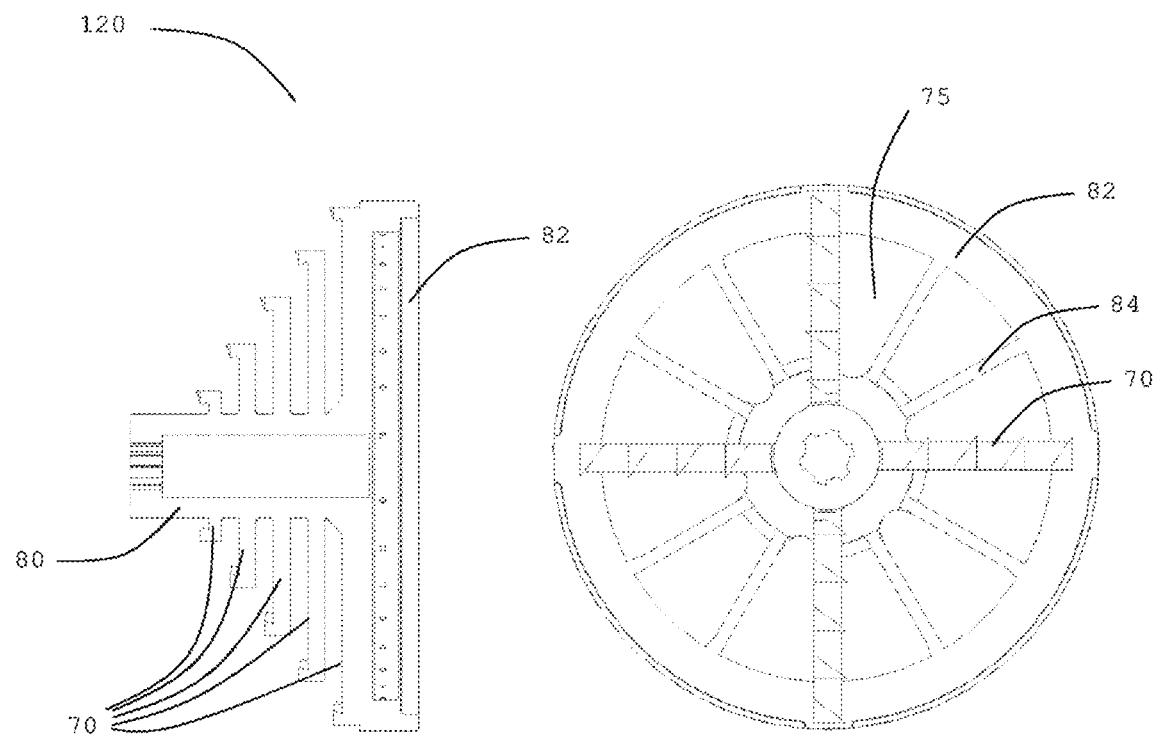
FIG. 12 shows a planar and sectional view of the movable part of the rotary head in which are shown the fixed part, the movable part, the rotating tip and the movable flow openings, with parts and details omitted for the sake of clarity.
Figure 13:
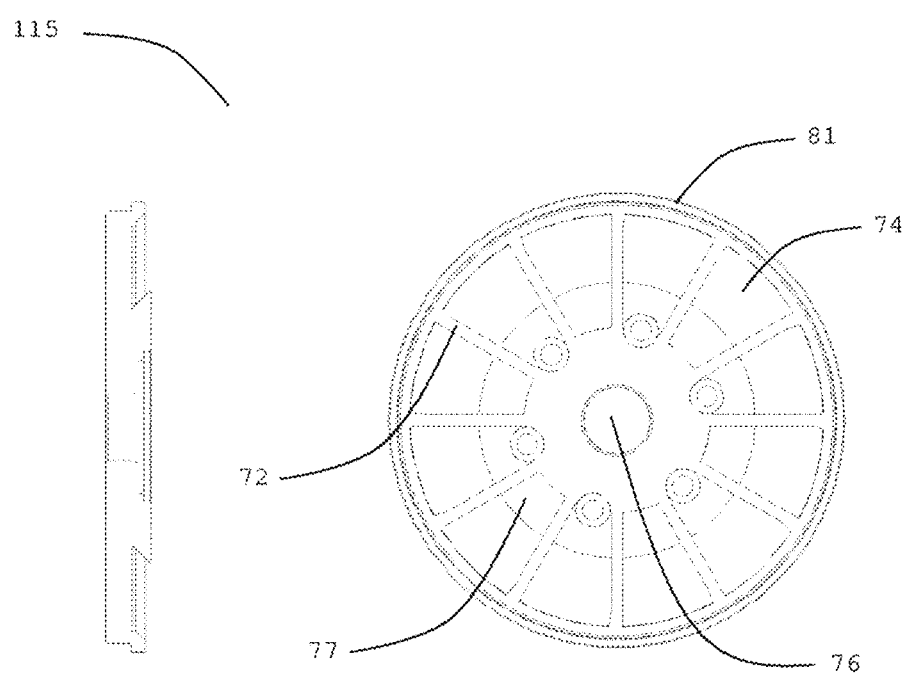
FIG. 13 shows a planar and sectional view of the fixed part of the rotary head in which are shown the radial arms, the associated cutting profiles, and the fixed flow openings, with parts and details omitted for the sake of clarity.

With reference to FIG. 5, in a preferred configuration of the invention, the motor device 50 therefore comprises a plurality of centering brushes 61 that extend radially relative to the axis of rotation A for a length predetermined to start from at least one brush-bearing collar 60 installed on the surface of the casing 55. In a further preferred configuration, two brush-bearing collars 60 are present.

The remote control system 7 serves to selectively guide the behaviour of the apparatus 1 by modifying the speed and direction of movement within the pipeline 5, by varying the speed of rotation and the direction of rotation (clockwise or anticlockwise) of the rotary head 10, 110 and by monitoring continuously and in real time the advance of the apparatus 1 and the functioning thereof. To this end, the apparatus 1 advantageously comprises one or more instruments that allow the state of the activities during use of the apparatus 1 to be detected. In a preferred configuration of the invention, the apparatus 1 may therefore comprise:

- at least one temperature sensor installed in contact with the housing of the gearmotor 51; this sensor continuously measures the temperature of the housing of the gearmotor 51;
- at least one temperature sensor installed in contact with at least one metal heat dissipator element (59) to verify the effectiveness of dissipation; in this way it is possible to establish whether the dissipation of heat by means of the metal elements is effective;
- at least one internal pressure sensor to monitor the pressure of the diathermic and dielectric fluid; in this way the trend of the pressure within the casing 55 is controlled while avoiding situations of risk due to excessive values of internal pressure;
- at least one external pressure sensor to monitor the fluid pressure external to the casing 55; in this way it is possible to understand the difference between the pressure inside and externally to the casing 55 and therefore to predict correct functioning of the pressure compensator;
- at least one microphone configured to receive sounds coming from the environment external to the casing 55. Use of a microphone to listen to the sounds produced during the cleaning operations enables understanding of how disaggregation of deposits happens, if a change occurs in their consistency, hardness and therefore resistance. Listening to the sounds via the installed microphone enables identification of variations in the conditions external to the apparatus 1 and acquisition of data regarding any wear of the various moving mechanical parts: for example, changes in the harmonic spectrum of the sound signal may represent a symptom of wear of the rotating components, the presence of noises of "impulse" type, such as for example blows or pounding, may be traced to the presence of elements/consolidations that are harder than the deposit being broken up.

On the basis of the information acquired by means of one or more sensors or microphone described above, the remote control system 7 modifies the operating parameters of the apparatus 1 such as, for example, speed of movement, speed and direction of rotation of the rotary head 10, 110.

A further advantage of the apparatus 1 according to the present invention is that the rotary head 10, 110 is interchangeable, thus allowing the use of different rotary heads based on the type of deposits present within the pipeline 5. On the basis of the quantity, thickness and hardness of the deposits, the apparatus 1 can be equipped with rotary heads of differing designs better adapted to particular deposits to be removed from the pipeline 5.

With reference to FIGS. 6, 7, 8 and 9, in a preferred configuration of the invention the rotary cleaning head 10 comprises:

- a fixed part 11 comprising:
    - a fixing flange 29, integral with the casing 55 of the motor device 50, provided with a hole 33 for passage of the transmission shaft 56;
    - a hollow tubular element 26, protruding orthogonally from the fixing flange 29 and co-axial with the passage hole 33, set up to be crossed coaxially by the transmission shaft 56;
    - a circular crown 28 placed in the rear part of the rotary head 10, coaxial with the hollow tubular element 26 and said circular crown 28 being of internal diameter larger than that of the fixing flange 29;
    - a plurality of radial ribs 27 protruding from the external surface of the hollow tubular element 26 and integral with the fixing flange 29 and with the circular crown 28, the radial ribs 27 having a form such as to configure an upright truncated cone structure of the fixed part 11 and delimiting a plurality of fixed passage apertures 20;
- a movable part 12 comprising:
    - a front ring 21 and a rear ring 22 of internal diameter that is larger than both the external diameter of the front ring 21 and then the external diameter of the circular crown 28, that are placed coaxially and distanced by means of connecting arms 23 skewed to form an upright, truncated cone structure of the movable part 12 and delimiting a plurality of movable passage apertures 25;

The fixed part 11 being integral with the casing 55 and with the hollow tubular element 26 coaxial with the transmission shaft 56 which protrudes beyond the hollow tubular element 26 on the front part of the rotary head 10, while the movable part 12 is coaxially installed in front of the fixed part 11 in such a way that a portion of the transmission shaft 56 protruding is torsionally engaged with the front ring 21 permitting rotation of the movable part 12.

It is therefore evident from the description and from the drawings that the preferred embodiment of the rotary head 10 described above configures the combination of a fixed part 11 and a movable part 12 coaxially installed relative to the transmission shaft 56 in such a way that the movable part 12 is placed in rotation with respect to the fixed part 11. Both the fixed part 11 and the movable part 12 have the shape substantially of an upright truncated cone that allows good penetration into the deposits to be eliminated from the pipeline 5. In a further preferred configuration of the rotary head 10, interposed between the movable part 12 and the fixed part 11 of the rotary head 10 there are a front bearing 31 between the front ring 21 and the front end of the hollow tubular element 26, and a rear bearing 32 between the rear ring 22 and the circular crown 28 rendering the fixed part 11 a structural element collaborating with the persistent stresses on the movable part 12. Interposition between the movable part 12 and the fixed part 11 of bearings that transmit to the fixed part 11 the stresses impinging on the movable part 12 during the cleaning operations and disintegration of the deposits increases the rigidity of the rotary head 10, thus reducing the deformations in operation.

For the purpose of increasing the effectiveness of removal of the deposits in the pipeline 5, in a further preferred configuration the skewed connecting arms 23 of the rotary head 10 comprise a plurality of prominences 24, facing onto the front part of the rotary head 10, equipped with removable cutting inserts 13. In this way, during rotation and advancement of the rotary head 10, the cutting inserts 13 break up the deposits within the pipeline 5. The cutting inserts 13 are advantageously removable to guarantee prompt replacement in case of breakage or wear.

In a further preferred configuration of the invention, the removable cutting inserts 13 are placed in an offset arrangement on the connecting arms 23 in such a way that the truncated cone surface described by the skewed connecting arms 23 during rotation of the movable part 12 is integrally brushed by the cutters 13. This guarantees a complete and uniform action of removal of the deposits by the cutting inserts 13 during rotation of the movable part 12. According to the arrangement of the cutting inserts and the number of connecting arms 23, total coverage of the brushed surface can be achieved with a half revolution or a complete revolution of the movable part 12.

In a further preferred configuration of the invention as shown in FIGS. 9, 10, 11 and 12, the rotary cleaning head 110 of the apparatus 1 for internal cleaning of a pipeline 5 comprises:

a fixed part 115 comprising:
  a fixing flange 77, integral with the casing 55 of the motor device 50, provided with a hole 76 for passage of the transmission shaft 56;
  a circular crown 81 coaxial with the passage hole 76 and said circular crown 81 being of external diameter larger than that of the fixing flange 77;
  a plurality of radial elements 72, each of which departs from the fixing flange 77 and unites with the circular crown 81, which elements are placed in such a way as to configure a radial structure that delimits a plurality of fixed passage apertures 74;
a movable part 120 comprising:
  a rear ring 82, of internal diameter that is larger than the external diameter of the circular crown 81, placed coaxially to the passage hole 76;
  a hollow tubular element 80, protruding orthogonally from the front surface of the rear ring 82 and coaxial with the passage hole 76, set up to be traversed coaxially by the transmission shaft 56;
  a plurality of movable radial elements 84 that extend from the external surface of the hollow tubular element 80 as far as the rear ring 82 and delimiting a plurality of movable passage apertures 75;
  a plurality of radial arms 70 placed on a plurality of planes parallel and orthogonal to the axis of rotation A, protruding from the external surface of the hollow tubular element 80 in such a way that the length of the radial arms 70 referred to a rear plane is greater relative to the length of the radial arms 70 referred to a front plane, the free ends of the radial arms (70) being provided with cutting profiles (71);

The fixed part 115 being integral with the casing 55 and with the passage hole 76 coaxial with the transmission shaft 56 while the movable part 120 is installed in front of the fixed part 115 with the hollow tubular element 80 coaxial with the passage hole 76 in such a way that a portion of the transmission shaft 56 is torsionally engaged with the front part of the hollow tubular element 80 permitting rotation of the movable part 120 and said transmission shaft 56 is protruding beyond the hollow tubular element 80 on the front part of the rotary head 110. Preferably, in the rotary head 110, between the movable part 120 and the fixed part 115 of the rotary head 110, a rear bearing 85 is interposed between the rear ring 82 and the circular crown 81. Said bearing enables facilitation of the rotation of the movable part 120 under load by transferring part of the strain to the fixed part 115, maintaining the necessary capacity for free rotation.

In the case wherein the quantity and location of the deposits internal to the pipeline 5 are such as to totally block the internal passage section, the operations of breaking up the deposits are benefited by a device for penetrating into the block of deposits. For this purpose it is especially advantageous to equip the rotary head in any one of its preferred embodiments with a rotary perforating bit which, by means of advancement of the apparatus 1, engages in the blocking deposits creating a gap and allowing subsequent removal of said deposits. In a preferred configuration of the invention, therefore, in the apparatus 1 for internal cleaning of a pipeline 5, the rotary head 10, 110 comprises a rotary perforating bit 30, 73 coaxially installed in front of the movable part 12, 120 in such a way that a protruding portion of the transmission shaft 56 is coupled torsionally to the rotary perforating bit 30,73, allowing rotation thereof together with the mobile part 12, 120. The rotary perforating bit 30, 73 is preferably equipped with cutting profiles apt to favour the penetration and removal of part of the blocking deposits.

Figure 3:
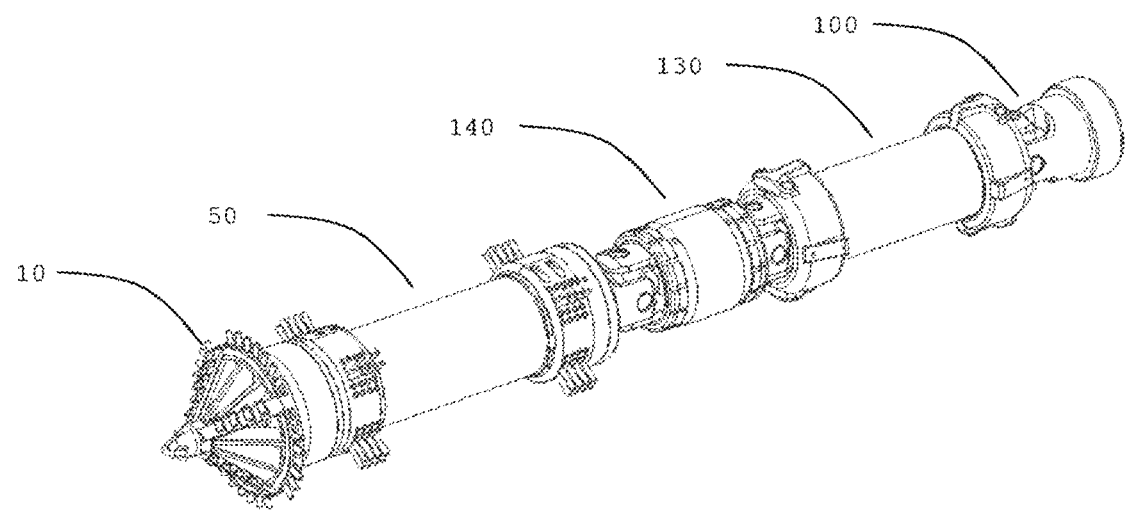
FIG. 3 shows a three-dimensional view of the rotary head connected to the motor device in which a "dual vessel" configuration is produced, with parts and details omitted for the sake of clarity.

Normally, the motor device 50, as well as comprising, within the casing 55, the gearmotor 51, the pressure compensator and the casing 55 being filled with a diathermic and dielectric fluid, is equipped with electronic components serving for the functioning of the gearmotor 51 and of the installed sensors. With reference to FIG. 3, in particular operative cases or anomalous cases wherein the pressure and/or the temperature within the casing 55 reach values not compatible with correct functioning of the electronics, it can be advantageous to segregate the electronic components by installing them separately from the gearmotor 51 assembly in a dedicated electronics module 130. For the purposes of the present invention, this configuration is called "dual vessel". In a preferred configuration of the invention, the apparatus 1 comprises an electronics module 130 containing the electronic components serving for the functioning of the gearmotor 51 and of the installed sensors. The electronics module 130 is preferably interposed between the motor device 50 and the movement device 90 and connected with connections of signals and power to both. For the purpose of guaranteeing the necessary swivellability of the apparatus 1 with a view to moving also in curved sections of the pipeline 5, the electronics module 130 is connected to the motor device 50 preferably by means of a double swivel joint 140, more preferably a double universal joint and to the movement device 90 preferably by means of a swivel joint 100, more preferably a universal joint.

In any one of the preferred configurations previously described, the rotary head 10, 110 is equipped with a fixed part 11, 115 and a movable part 12, 120 which respectively configure fixed passage apertures 20, 74 and movable passage apertures 25, 75. The functions of said apertures are multiple; the latter guarantee the passage of fluid normally circulating in the pipeline 5 so as to obviate shutdown of production when the apparatus 1 is engaged in the pipeline 5. Furthermore, the relative rotation between the movable passage apertures 25, 75 and fixed passage apertures 20, 74 exerts a crushing action on the deposits, detached by mechanical action by the movable part 12, 120 of the rotary head 10, 110 and evacuated by means of the normally circulating fluid. Therefore, in the case wherein the deposits, once detached from the interior of the pipeline 5, are found to have dimensions not compatible with their disposal using the normal working fluid as carrier, the passage of said deposits through the passage apertures 25, 75, 20, 74 of the rotary head 10, 110 determines a shredding thereof depending on the dimension of said passage aperture. To summarise, therefore, a further advantage of the present invention is that of reducing the dimension of the deposits detached from the interior of the pipeline 5 so as to make them flow easily using the normal working fluid as the carrier and to minimise appreciably the risk of obstruction during evacuation of the deposits removed. The synergistic effect of the movable passage apertures 25, 75 and fixed passage apertures 20, 74 in grinding of the deposits due to their relative motion proves unexpectedly advantageous.

For the purpose of improving the effectiveness of cleaning of the apparatus 1, a plurality of radial brushes 14, 78 may be installed on the rotary head 10, 110. Due to the combined movement of rotation and advancement, the brushes 14, 78 are particularly effective for freeing the internal surface of the pipeline 5 from deposits, said brushes also—due to their intrinsic flexibility—allow the apparatus 1 to operate effectively also in sections of pipeline affected by dimensional imperfections that would impede passage to a rigid body engaging the internal surface of the pipeline. In a preferred configuration of the present invention according to any one example embodiment previously described, the rotary head 10, 110 comprises a plurality of brushes 14, 78 that extend radially from the rear ring 22, 82 of the movable part (12, 120) for a predetermined length, preferably as far as to touch the internal surface of the pipeline 5. In a further preferred configuration of the invention, the brushes 14, 78 are obtained metal filaments.

An object of the present invention is also a process for internal cleaning of a pipeline 5 comprising the steps of:
  introducing into the pipeline 5 an apparatus 1 according to any one of the preferred configurations described;
  maintaining in circulation at least part of the flow of fluid normally flowing in the pipeline 5;
  shifting the apparatus 1 along the pipeline 5 by selectively activating the movement device 90 by means of a remote control system 7;
  selectively activating the rotation of the rotary head 10, 110 by means of the motor device 50;
  moving the apparatus 1 along the pipeline 5 and simultaneously rotating the rotary head 10, 110 engaging deposits that are present within the pipeline 5 and are at least partially blocking;
  by mechanical actions breaking up the at least partially blocking deposits by means of interaction with the brushes 14, 78, the cutting inserts 13 or the cutting profiles 71;
  shredding the broken-up deposits by means of passage through the movable passage apertures 25, 75 and fixed passage apertures 20, 74;
  evacuating the shredded deposits by means of the partially circulating flow of fluid normally flowing in the pipeline 5.

The apparatus 1 is then introduced into the pipeline 5 and shifted until it is in proximity of the blocking deposits that are engaged by setting the rotary head 10, 110 in rotation and simultaneously moving the apparatus 1 further. The interaction of the cutting inserts 13 or cutting profiles 71 with the deposits within the pipeline 5 is particularly effective in breaking up agglomerates of blocking deposits. Furthermore, the radial brushes 14 contribute to cleaning the internal surface of the pipeline during advancement of the apparatus 1. The mechanically detached deposits are then shredded through passage between the movable areas of passage and the fixed ones, reducing their size in order to be advantageously evacuated by means of the fluid normally circulating within the pipeline 5. Because the type of the deposits and their hardness and resistance can vary according to the service of the line, break-up of the deposits may necessitate more or less intensive actions. To this end the speed of the rotary head 10, 110 and the speed of advancement of the apparatus 1 may be advantageously selectively varied by means of the remote system 7 for control and power. In a preferred configuration of the invention, the process for internal cleaning of a pipeline 5 comprises the further step of selectively varying the speed of rotation of the rotary head 10, 110 and the rate of shifting of the apparatus 1 by means of the remote control system 7.

The adoption of at least one temperature sensor installed in contact with the housing of the gearmotor 51, of at least one temperature sensor installed in contact with at least one metal heat-dissipator element 59, of at least one internal pressure sensor to monitor the pressure of the diathermic and dielectric fluid, of at least one external pressure sensor to monitor the pressure of the fluid external to the casing 55 and of at least one microphone configured to receive sounds coming from the environment external to the casing 55 allows collection of operating parameters on the functional status of the apparatus 1. The parameters acquired by means of the instrumentation installed on the apparatus 1 are sent to the remote control system 7, preferably by means of data telemetry in real time. The parameters acquired are taken into consideration to selectively vary the speed of rotation of the rotary head 10, 110 and the rate of shifting of the apparatus 1 with the aim of safeguarding the apparatus 1, the pipeline 5 and at the same time of speeding up the cleaning operations.

Non-limiting examples of the approaches implemented, either individually or in combination, to selectively vary the rotation speed of the rotary head 10, 110 and the rate of shifting of the apparatus 1 are described below:
  when the current absorbed by the gearmotor 51 and the torque exerted to cause the rotary head 10, 110 to rotate at a selected rotation speed is lower than a predefined value for that speed, a combined increase in the speed of rotation of the rotary head 10, 110 and of the rate of shifting of the apparatus 1 is arranged, reducing the cleaning intervention times;
  when the current absorbed by the gearmotor 51 and therefore the torque exerted to cause the rotary head 10, 110 to rotate at a selected rotation speed is greater than a predefined value for that speed, a combined reduction in the speed of rotation of the rotary head 10, 110 and of the rate of shifting of the apparatus 1 is arranged, until the value for absorbed current is restored to below the predefined value;
  when the harmonic spectrum of the sound signal picked up by the microphone changes during an operating step at constant speed of rotation of the rotary head and of shifting of the apparatus 1, a combined reduction is arranged of the two speeds that may even go as far as total shutdown of operations, providing subsequently for recovery of the apparatus 1 from the pipeline 5.
  When the temperature measured by at least one of the installed temperature sensors increases beyond a predetermined maximum threshold, the power transmitted to the motor device 50 is reduced by combined slowing both of the speed of rotation of the rotary head 10, 110 and the rate of shifting of the apparatus 1 until the measured temperature returns below a predetermined threshold value.

When the difference between the pressure within the casing 55 and the pressure external to the apparatus 1 exceeds a predefined value, a combined reduction is arranged of the two speeds that may even go as far as total shutdown of operations, providing subsequently for recovery of the apparatus 1 from the pipeline 5.

In a preferred configuration of the process that is an object of the invention, the maximum speed of rotation of the rotary head 10 is 60 revolutions/minute; said speed of rotation is particularly advantageous for the mechanical removal of the harder deposits.

In a further preferred configuration of the process that is an object of the invention, the maximum speed of rotation of the rotary head 110 is 300 revolutions/minute; this rotation speed is considered particularly advantageous for the mechanical removal of softer deposits.

In a preferred configuration of the procedure that is an object of the invention, the maximum torque expressed by the gearmotor 51 is 110 Nm.

The apparatus for internal cleaning of a pipeline 5 and the related process that is an object of the invention, thus designed, are in any case subject to numerous modifications and variations, all coming within the same inventive concept; furthermore all the details may be substituted with technically equivalent elements. In practice the materials used, as well as the shapes and sizes, may be any in accordance with technical requirements.

The sphere of protection of the invention is therefore defined by the appended claims.

The invention claimed is:

1. An apparatus for internal cleaning of a pipeline, the apparatus comprising:
   an interchangeable rotary cleaning head;
   a motor device coupled to the rotary cleaning head to selectively control the rotation thereof, the motor device comprising a casing, a gearmotor accommodated within the casing and a transmission shaft, that defines an axis of rotation A, projecting from the casing;
   a movement device connected to the motor device and configured to move the apparatus within the pipeline, the movement device being connected to the motor device; and
   a remote system for controlling the apparatus, wherein the remote system is connected to the motor device and to the movement device by a means apt to transfer electrical signals and power;
   wherein the motor device is interposed between the rotary cleaning head and the movement device;
   the rotary cleaning head comprises:
      a fixed part including;
         a fixing flange integral with the casing of the motor device, provided with a passage hole for passage of the transmission shaft;
         a circular crown coaxial with the passage hole and having an external diameter larger than an external diameter of the fixing flange; and
         a plurality of radial elements, each of which departs from the fixing flange and unites with the circular crown, wherein the plurality of radial elements are placed in such a way as to configure a radial structure that delimits a plurality of fixed passage apertures;
      a moveable part including:
         a rear ring, of internal diameter that is larger than the external diameter of the circular crown, placed coaxially to the passage hole;
         a hollow tubular element, protruding orthogonally from the front surface of the rear ring and coaxial to the passage hole, set up to be traversed coaxially by the transmission shaft;
         a plurality of movable radial elements that extend from the external surface of the hollow tubular element as far as the rear ring and delimiting a plurality of movable passage apertures;
         a plurality of radial arms placed on a plurality of planes parallel and orthogonal to the axis of rotation (A) and protruding from the external surface of the hollow tubular element so that the length of the radial arms referred to a rear plane is greater with respect to the length of the radial arms referred to a front plane, the free ends of the radial arms being provided with cutting profiles;
   wherein the fixed part is integral with the casing and with the passage hole coaxial with the transmission shaft while the movable part is installed in front of the fixed part with the hollow tubular element coaxial to the passage hole in such a way that a portion of the transmission shaft is torsionally engaged with the front part of the hollow tubular element to permit rotation of the movable part and the transmission shaft is protrudes beyond the hollow tubular element on the front part of the rotary head.

2. The apparatus according to claim 1, wherein the rotary head is provided with at least one aperture that allows a fluid to pass between the front part and the rear part of the rotary head.

3. The apparatus according to claim 1, wherein the movement device is connected to the motor device by a swivel joint.

4. The apparatus according to claim 1, wherein the casing, motor device, and movement device each have an area of maximum dimensions evaluated in a transverse section lying on a plane orthogonal to the axis of the transmission shaft that is smaller than an area of maximum dimension, evaluated in a transverse section lying on a plane orthogonal to the axis of the transmission shaft, of the movable part of the rotary head.

5. The apparatus according to claim 1, wherein the motor device comprises:
   one or more metal heat-dissipator elements placed in contact with the housing of the gearmotor, wherein the casing of the motor device is filled with a diathermic and dielectric fluid; and
   a pressure compensator exposed both to the pressure of the diathermic and dielectric fluid and to the pressure of fluid external to the casing;
   wherein the pressure compensator is configured to balance the pressure of the diathermic and dielectric fluid, the volume of which is influenced by variations in temperature induced by the one or more metal heat-dissipator elements relative to the external pressure.

6. The apparatus according to claim 1, wherein the motor device comprises a plurality of centering brushes that extend radially relative to the axis of rotation for a predetermined length starting from at least one brush-bearing collar installed on a surface of the casing.

7. The apparatus according to claim 1, comprising:
at least one temperature sensor installed in contact with a housing of the gearmotor;
at least one temperature sensor installed in contact with at least one metal heat-dissipator element to verify the effectiveness of dissipation;
at least one internal pressure sensor to monitor the pressure of a diathermic and dielectric fluid;
at least one external pressure sensor to monitor a fluid pressure external to the casing; and
at least one microphone configured to receive sounds coming from an environment external to the casing.

8. The apparatus according to claim 1, the apparatus further comprising:
a rear bearing interposed between the rear ring and the circular crown.

9. A process for internally cleaning a pipeline, the process comprising the steps of:
introducing the apparatus according to claim 1 into the pipeline;
maintaining a partially circulating flow of fluid normally flowing in the pipeline;
shifting the apparatus along the pipeline by selectively activating the movement device with the remote system;
selectively activating the rotation of the rotary head with the motor device;
moving the apparatus along the pipeline and simultaneously rotating the rotary head to engage with at least partially blocking deposits that are present within the pipeline;
breaking up the at least partially blocking deposits into broken-up deposits by mechanical action;
shredding the broken-up deposits by passing the broken-up deposits through movable passage apertures and fixed passage apertures; and
evacuating the shredded deposits with the partially circulating flow of fluid normally flowing in the pipeline.

10. The process according to claim 9, comprising the further step of selectively varying the speed of rotation of the rotary head and the rate of shifting of the apparatus by means of the remote system.

11. The process according to claim 10, wherein the selective variations in the rotation speed of the rotary head and of the rate of shifting of the apparatus depend on telemetric data acquired in real time by at least one of the instruments installed on the apparatus.

12. The process according to claim 11, wherein the mechanical action is interaction with the brushes, the cutting inserts or the cutting profiles.

13. An apparatus for internal cleaning of a pipeline, the apparatus comprising:
an interchangeable rot cleaning head;
a motor device coupled to the rotary cleaning head to selectively control the rotation thereof, the motor device comprising a casing, a gearmotor accommodated within the casing and a transmission shaft, that defines an axis of rotation A, projecting from the casing;
a movement device connected to the motor device and configured to move the apparatus within the pipeline, the movement device being connected to the motor device; and
a remote system for controlling the apparatus, wherein the remote system is connected to the motor device and to the movement device by a means apt to transfer electrical signals and power,
wherein the motor device is interposed between the rotary cleaning head and the movement device;
the rotary head comprises:
a fixed part including:
a fixing flange, integral with the casing of the motor device, provided with a passage hole for passage of the transmission shaft;
a hollow tubular element, protruding orthogonally from the fixing flange and co-axial with the passage hole, set up to be traversed coaxially by the transmission shaft;
a circular crown placed in a rear part of the rotary head, coaxial with the hollow tubular element, the circular crown having an internal diameter larger than that of the fixing flange;
a plurality of radial ribs protruding from an external surface of the hollow tubular element and integral with the fixing flange and with the circular crown, the plurality of radial ribs configured in an upright truncated cone structure of the fixed part and delimiting a plurality of fixed passage apertures;
a movable part including:
a front ring and a rear ring having an internal diameter that is larger than both an external diameter of the front ring and the external diameter of the circular crown,
wherein the front ring and the circular crown are placed coaxially and distanced by connecting arms skewed to form an upright, truncated cone structure of the movable part and delimiting a plurality of movable passage apertures;
wherein the fixed part is integral with the casing and with the hollow tubular element coaxial with the transmission shaft which protrudes beyond the hollow tubular element on the front part of the rotary head, while the movable part is coaxially installed in front of the fixed part so that a protruding portion of the transmission shaft is torsionally engaged with the front ring thereby permitting rotation of the movable part.

14. The apparatus according to claim 13, further comprising a front bearing between the front ring and the front end of the hollow tubular element; and
a rear bearing between the rear ring and the circular crown,
wherein the front bearing and the rear bearing are interposed between the movable part and the fixed part of the rotary head.

15. The apparatus according to claim 13, wherein the skewed connecting arms comprise a plurality of prominences facing the front part of the rotary head and equipped with removable cutting inserts.

16. The apparatus according to claim 15, wherein the removable cutting inserts are in an offset arrangement in such a way that the truncated cone surface described by the skewed connecting arms during rotation of the movable part of the rotary head is integrally brushed by the cutters.

17. The apparatus according to claim 13, wherein the rotary head comprises a rotary perforating bit coaxially installed in front of the movable part so that a protruding portion of the transmission shaft is torsionally coupled to the rotary perforating bit to allow its rotation together with the movable part.

18. The apparatus according to claim 13, wherein the rotary head comprises a plurality of brushes that extend radially from the rear ring of the movable part for a predetermined length.

19. The apparatus according to claim 18, wherein the brushes are obtained from metal filaments.

20. A process for internally cleaning a pipeline, the process comprising the steps of:
- introducing the apparatus according to claim 8 into the pipeline;
- maintaining a partially circulating flow of fluid normally flowing in the pipeline;
- shifting the apparatus along the pipeline by selectively activating the movement device with the remote system;
- selectively activating the rotation of the rotary head with the motor device;
- moving the apparatus along the pipeline and simultaneously rotating the rotary head to engage with at least partially blocking deposits that are present within the pipeline;
- breaking up the at least partially blocking deposits into broken-up deposits by mechanical action;
- shredding the broken-up deposits by passing the broken-up deposits through movable passage apertures and fixed passage apertures; and
- evacuating the shredded deposits with the partially circulating flow of fluid normally flowing in the pipeline.

21. The process according to claim 20, comprising the further step of selectively varying the speed of rotation of the rotary head and the rate of shifting of the apparatus by means of the remote system.

22. The process according to claim 21, wherein the selective variations in the rotation speed of the rotary head and of the rate of shifting of the apparatus depend on telemetric data acquired in real time by at least one of the instruments installed on the apparatus.

23. The process according to claim 22, wherein the mechanical action is interaction with the brushes, the cutting inserts or the cutting profiles.

* * * * *